May 25, 1965    C. E. JORDAN    3,185,949
CODED CONTROL PLATE READER WITH PLURAL SIGNAL ACTUATED MEANS
Filed Jan. 24, 1961    3 Sheets-Sheet 1
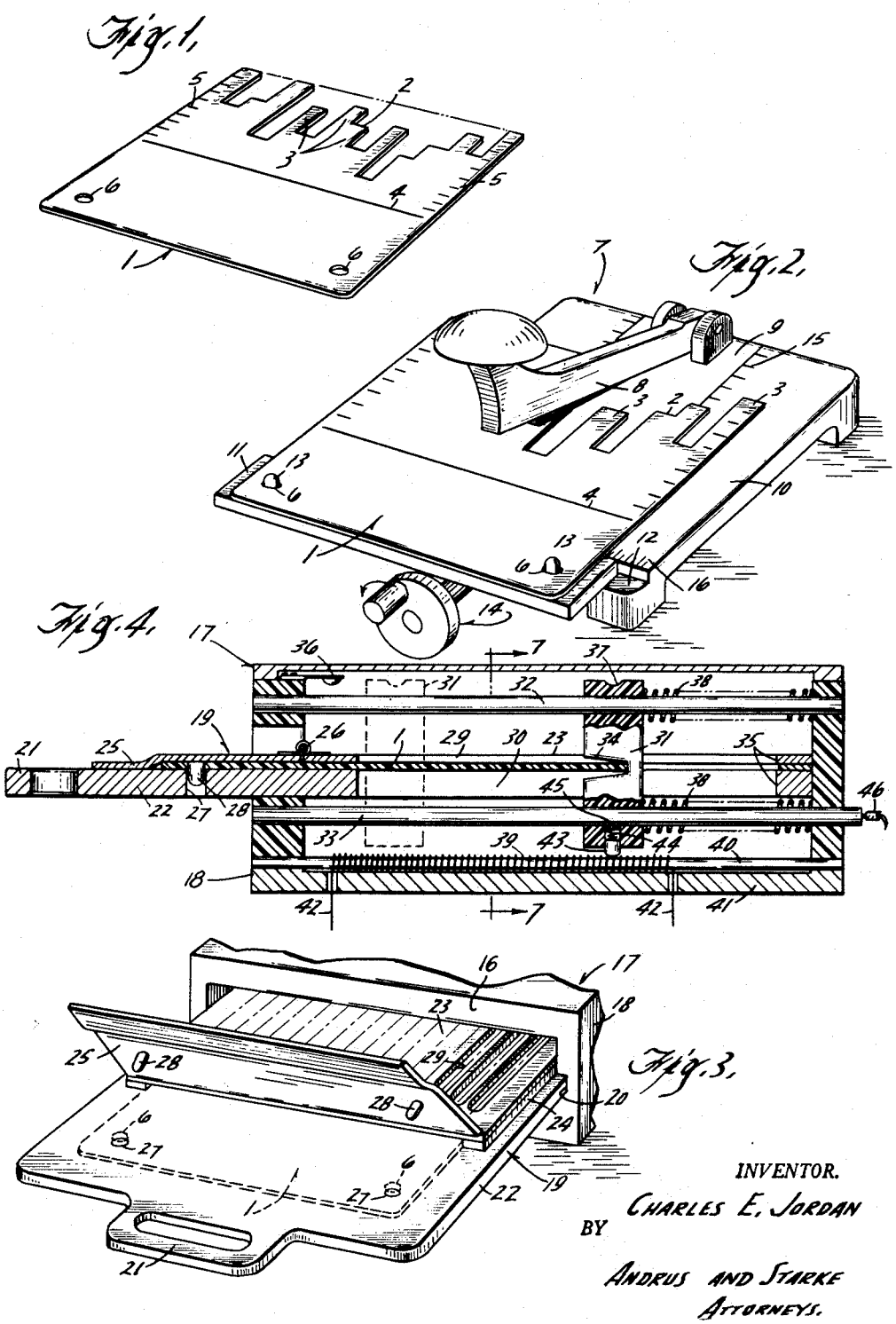
INVENTOR.
CHARLES E. JORDAN
BY
ANDRUS AND STARKE
ATTORNEYS.

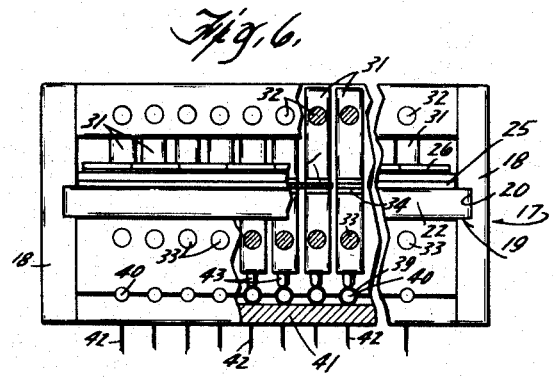

May 25, 1965 C. E. JORDAN 3,185,949
CODED CONTROL PLATE READER WITH PLURAL SIGNAL ACTUATED MEANS
Filed Jan. 24, 1961 3 Sheets-Sheet 3
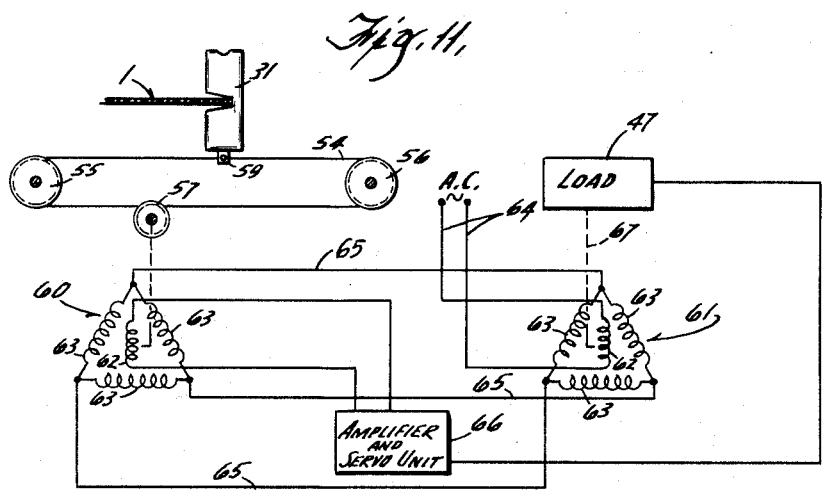
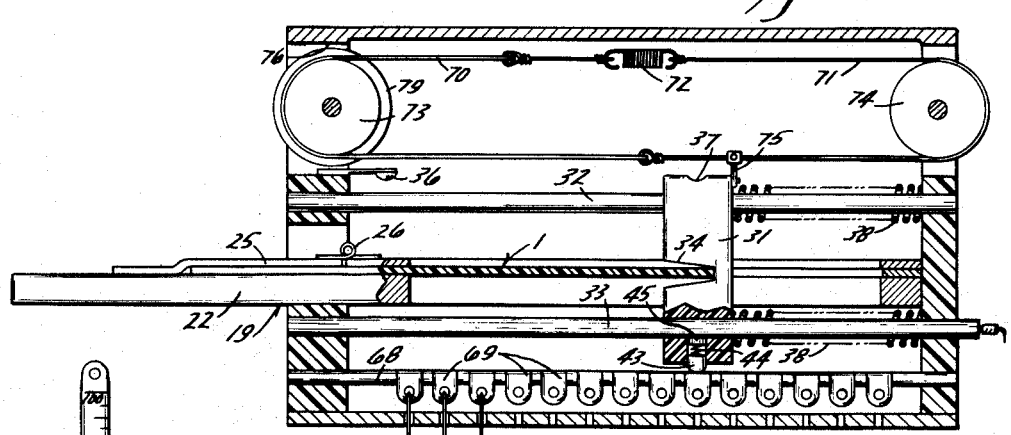
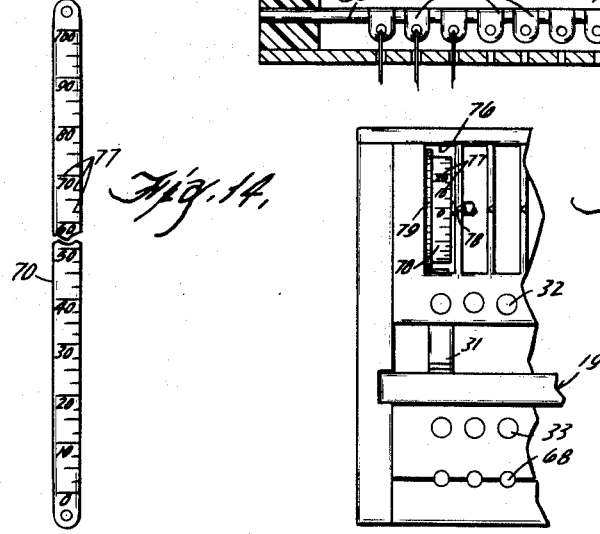
INVENTOR.
CHARLES E. JORDAN
BY
ANDRUS AND STARKE
ATTORNEYS.

United States Patent Office 3,185,949
Patented May 25, 1965

3,185,949
CODED CONTROL PLATE READER WITH PLURAL SIGNAL ACTUATED MEANS
Charles E. Jordan, Milwaukee, Wis., assignor to Jordan Controls, Inc., Milwaukee, Wis., a corporation of Wisconsin
Filed Jan. 24, 1961, Ser. No. 84,619
20 Claims. (Cl. 338—131)

This invention relates to an automatic control and to an actuator for use therein and is particularly directed to a multiple automatic control having a series of movable output elements and an actuator having an offset edge for engaging said elements and establishing selected outputs as a direct result of inserting the actuator without the necessity for the conventional code translating devices.

Various multiple component processes and operations are presently automatically controlled through the use of conventional multi-perforated punched cards which can be inserted in a reading and translating device for automatically controlling the desired sequence.

The conventional punch card system includes code cards carrying the control information in the form of perforations arranged in columns and rows. A card is formed for each multiple component function with one or more columns coded for each of the components. The number of columns assigned to each function is proportional to the desired accuracy of the output. The card is inserted in a suitable card reader having a plurality of reading circuits which are completed in accordance with the perforations or the like in the proper code column to establish coded signals for each of the components. The reading circuits are normally connected to a translating device including a relay logic circuit having the relay contacts connected to vary the connection of precision resistors in a voltage circuit for each component. In this manner, separate control signals are established for each component or function.

For example, in blending and mixing of a formula, the various product feeds may be automatically controlled through a punch card system. Similarly, movement of machine tools can be automatically controlled.

The card reader requires precision relays and resistors to provide reliable operation for practical periods. Precision elements are relatively expensive and automatic controls are generally correspondingly expensive.

To avoid the complexity and expense of a perforated card and card reader, an individual bank or presettable potentiometers for each multiple component function has been suggested in the prior art as the storage means. Each bank of potentiometers includes similar means for selective direct insertion into a control. Thus, in a feed blending production, each formula is provided with a separate bank of potentiometers. This system, although somewhat lower in cost than the card reader, is nevertheless relatively expensive. Further, the storing and handling of many banks of potentiometers is cumbersome and inconvenient. Automatic controls have not therefore been generally economically adapted to small inexpensive machines and operations.

The conventional perforated punched card code system is also very difficult to read visually and the operator cannot determine the information which is being inserted into the machine. As a result, the operator is often left with a fear and doubt as to whether a correct selection has been made for the tool or process control.

The present invention is particularly directed to an improved control providing a readily stored and replaced code storage means for application in multiple component batch or continuous flow processing, machine tooling or any other multiple component functioning device.

In accordance with the present invention, a code storage and actuator is provided with a notched or offset operating edge defining a plurality of operating fingers extending from a reference line. Each finger is calibrated in accordance with the desired proportion or control of one of the components or a multiple of components. A decoder or control includes means receiving and guiding the fingers of the actuator into engagement with a series of control elements. The control elements are movably mounted and positioned in accordance with the length of the fingers. A take-off means is connected for simultaneous movement with the control element and is coupled directly to control signal generators or the like to provide the desired output signals without the necessity for intermediate translation of a plurality of significant code indicia. The code actuator may be a plate formed of paper, metal, plastic material or the like which permits cutting the operating fingers into the plate with a conventional knife or scissors.

To readily permit the operator to check on the information being inserted into the control, the card may include calibrations in the finger portion of the card. Further, a scale or visual display may be interconnected with the control element of the decoder to provide a direct visual reading of the positioning of the several control elements.

Manually controlled means may also be associated with the control elements to allow individual manual positioning of the input to each signal generator as well as automatic operation of the apparatus. Thus, if a card is lost or damaged, the control can still be used.

The present invention eliminates the need for precision contacts and relays normally associated with the translating and interpreting portions of a conventional perforated card reader. The present invention by combining the reading and translating function provides a simple versatile control employing a readily stored and replaced code storing and actuating means at a fraction of the cost of known controls. The code storing and actuating means may be readily formed in an inexpensive and accurate manner and the information carried thereon simply and easily calibrated for direct reading, if desired.

The drawings furnished herewith illustrate the best mode presently contemplated for carrying out the invention.

In the drawings:

FIG. 1 is a perspective view of a code storing and actuating plate constructed in accordance with the present invention;

FIG. 2 is a perspective diagrammatic view of a plate punch adapted for forming of the operating portion of the plate;

FIG. 3 is a perspective view of a control for directly reading and translating the code of the plate;

FIG. 4 is an enlarged vertical section through the control of FIG. 3;

FIG. 5 is an enlarged fragmentary top elevational view of FIG. 3 with parts broken away to clearly show the details of construction;

FIG. 6 is a front elevational view of FIG. 3 with parts broken away to show the inner details of construction;

FIG. 7 is a fragmentary vertical section taken on line 7—7 of FIG. 4;

FIG. 8 is a schematic circuit diagram of a feedback control incorporating the control of FIGS. 3–7;

FIG. 9 is a vertical section similar to FIG. 4 illustrating a rotary take-off for output of the code reader;

FIG. 10 is a top view of FIG. 9;

FIG. 11 is a schematic circuit diagram incorporating the apparatus of FIGS. 9 and 10;

FIG. 12 is a vertical section similar to FIGS. 4 and 9 illustrating a visual illustration of the code settings and a manual setting means incorporated into the automatic coupling within the control;

FIG. 13 is a front elevational view of FIG. 12 with parts broken away; and

FIG. 14 is an elevational view of a tape shown in FIGS. 12 and 13.

Referring to the drawings and particularly to FIG. 1, a code plate 1 is shown having a staggered or notched operating edge 2 defining a series of side-by-side operating fingers 3 of similar width and varying lengths from a reference or zero line 4. Plate 1 is originally generally rectangular in configuration as shown in phantom outline and edge 2 is formed by punching, cutting or otherwise removing selected forward portions of the plate 1 in accordance with a selected coding of fingers 3. Calibration indicia 5 is provided on the end or edge fingers 3 of plate 1 to give a direct reading of the information carried by the card. If desired, the several intermediate fingers 3 may of course be similarly calibrated. A pair of locating holes 6 are provided on the trailing end or portion of the plate 1.

The plate 1 is formed of a relatively heavy paper, plastic or the like which is sufficiently rigid to permit edge 2 to mechanically position control elements, as hereinafter described. A particularly satisfactory material is a linear polyethylene in the form of a thin, flexible sheet which can be readily cut to define edge 2. A linear polythylene is an extremely strong and durable material and can be readily cut to define fingers 3. If the material is folded or bent, a clearly discernible mark is formed at the fold. A plate 1 of linear polyethylene thus provides a readily filed code storing unit which discloses any damage or destruction of a portion thereof.

FIG. 2 illustrates a suitable punch or cutter 7 for accurately removing of the forward portion of the plate 1 to define the operating edge 2 and operating fingers 3.

Generally, the cutter 7 includes a manually operated knife 8 pivotally secured to a movable bed 9 which is slidably mounted in a base 10. The knife 8 is normally held in the raised position and the plate 1 is disposed between the knife 8 and the bed 9. The width of the knife 8 corresponds to the width of the fingers 3 and depression of the knife removes a proper strip from the leading edge of the plate 1. A lateral rule or guide 11 is movably secured on a track 12 in the front upper edge of the bed 9. Suitable locating pins 13 are secured to the guide 11 and spaced to accept locating holes 6 in plate 1 for proper positioning of the plate within the cutter 7. A hand knob screw adjustment 14 is connected to bed 9 in any suitable manner, not shown, for accurately setting of the knife 8 with respect to the reference line 4 of the plate 1 and determining the depth of the several notches and thus the length of the corresponding fingers 3. Calibration scales 15 and 16 are provided on the base 10 of cutter 7 for permitting accurate selective positioning of plate 1 when forming the several fingers 3.

Although plate 1 may be sufficiently thin to allow ready removal of the forward end with a scissors, knife or other suitable tool, a cutter 7 such as shown in FIG. 2, insures greater accuracy and uniformity in the construction of the operating fingers 3.

FIGS. 3–6 illustrate a preferred construction of a plate reader and control 17 constructed in accordance with the present invention to establish outputs in accordance with the length of fingers 3.

Generally, the control includes a rectangularly-shaped housing 18 having a plate supporting drawer 19 slidably supported within an opening in the forward wall thereof. Suitable side wall tracks 20 are provided in housing 18 to permit inserting and withdrawing of drawer 19.

Referring particularly to FIGS. 3 and 4, the illustrated drawer 19 includes an outer grip or handle 21 formed as an integral part of a bottom wall 22. A top wall 23 is secured to the inner end of the bottom wall 22 with side spacing ribs or walls 24 spaced therebetween in accordance with the width of plate 1 to define a plate holding chamber. The side walls 24 and plate 1 are generally of the same thickness such that the plate 1 fits snugly within the holding chamber. A front cover 25 is pivotally secured as by a piano hinge 26 to the top wall 23 and is adapted to be lifted upwardly as shown in FIG. 3 to allow insertion and removal of the plate 1 into the plate holding chamber. The outer end of the front cover 25 is offset to rest on the bottom wall 22 when cover 25 is closed.

The bottom wall 22 of drawer 19 includes a pair of holes 27 spaced in accordance with the locating holes 6 in the plate 1 for proper aligning of the plate 1 within the drawer 19. The cover 25 includes similarly displaced depending pins 28 and when the cover is closed, the pins 28 pass through the aligned holes 6 and 27 in the plate 1 and wall 22 to secure the plate properly positioned within the drawer 19.

Drawer 19 is longer than the maximum length of any portion of plate 1 and extends inwardly from the plate 1. Bottom wall 22 and top wall 23 include a series of superposed slots 29 and 30, respectively, aligned with the fingers 3 of plate 1, as most clearly shown in FIGS. 4–7. Individual sliders 31 project one each through each of the aligned slots 29 and 30 for positioning by the aligned plate finger 3.

Each slider 31 is generally a small rigid strip of plastic or other suitable insulating material slidably journaled upon upper and lower guide rods 32 and 33 each of which extends longitudinally through the upper and lower portions of housing 18.

Each slider 31 includes a V-shaped recess 34 facing and aligned with a corresponding finger 3. The base of the recess 34 is a vertical surface generally corresponding to the thickness of the plate 1 and vertically aligned therewith.

In operation, the edge 2 of the fingers 3 engages the base of the aligned recess 34 to positively position the sliders 31 from the forward end of the housing in accordance with the selected length of the fingers 3, as follows.

The length of drawer 19 and the superposed slots 29 and 30 provide space at the inner end of drawer 19 for the sliders 31 with an unnotched plate 1 properly positioned within the drawer 19. When the drawer 19 is pulled outwardly, the back edges 35 of slots 29 and 30 engage the back edge of the sliders 31 and positively transfer the latter forwardly to an initial starting or zero reference position adjacent the front of housing 18.

A small leaf spring 36 is mounted immediately adjacent the forward wall of housing 18 and the zero reference position of the sliders 31. The spring 36 extends laterally over the path of all sliders 31 and engages a small detent 37 in the upper edge of each slider at the zero reference position to resiliently hold the sliders 31 in the starting position. When the drawer 19 is moved inwardly, the operating edge 2 of the fingers 3 engages the aligned sliders 31 and positively moves the sliders inwardly on the guide rods 32 and 33. The sliders 31 are therefore positioned from the zero reference position in accordance with the length and calibration of the fingers 3.

As shown most clearly in FIGS. 5–7, the width of sliders 31 and of the aligned slots 29 and 30 is generally the same to provide maximum surface engagement of the fingers 3 and the sliders 31. Friction forces may be established between the adjacent surfaces upon the inward movement of drawer 19 tending to force the sliders 31 from the zero reference position. The illustrated spring 36 and detents 37 are desirable to provide a positive holding means to guard against such malfunctioning.

Similarly, as shown in FIGS. 4 and 5, small coil springs 38 are shown encircling the guide rods 32 and 33 between the back side of slider 31 and the back wall of housing 18 to positively insure holding of the slider 31 in engagement with the aligned finger 3. If desired, the friction forces of the slider 31 on the guide rods 32 and 33 may be employed to properly hold the sliders 31 in the several positions.

As most clearly shown in FIGS. 5 and 7, the width of slots 29 and 30 is less than the width of aligned finger 3 and the overlapping portion of the drawer walls 22 and 23 defining the superposed slots 29 and 30 constitutes a supporting or clamping means for the length of the fingers 3. This supports the fingers 3 and prevents buckling and shortening of the fingers 3 thereby insuring proper positioning of the sliders 31. Consequently, plate 1 can be formed from a relatively thin, flexible material.

As previously set forth, a thin sheet of a linear polyethylene is a very satisfactory material. Although the fingers 3 are flexible in a non-supported state, the fingers exhibit a very satisfactory column strength when clamped along the edges by the adjacent walls 22 and 23 and positively position the sliders 31.

If the plate 1 is formed of a sufficiently rigid and strong material, such clamping action of course need not be provided.

Referring particularly to FIGS. 4 and 7, a separate potentiometer winding 39 is wound upon a supporting rod 40 and is secured adjacent the bottom wall 41 of the housing 18 in alignment with the guide rods 32 and 33 of slider 31 to locate the winding 39 with slider 31. Winding leads 42 project outwardly through the bottom wall 41 and are connected to a suitable source of power, such as shown in FIG. 8, to establish a voltage drop across the potentiometer winding 39.

A sliding contact 43 is slidably mounted within a corresponding recess in the bottom edge of each slider 31. A coil spring 44 is disposed within the recess and urges the contact 43 into engagement with the corresponding winding 39. The contact 43 is therefore positioned on winding 39 in accordance with the positioning of the corresponding slider 31 and directly provides a voltage signal in proportion to the length of a finger 3. A transfer button 45 is disposed within the recess between spring 44 and the guide rod 33 and is urged into sliding engagement with rod 33. A lead 46 is secured to the back end of the lower guide rod 33 and is connected through rod 33, button 45 and spring 44 to contact 43 for connecting the signal into a control circuit.

Referring particularly to FIG. 8, the potentiometer winding 39 is shown connected in an illustrative control circuit for operating a suitable electro-responsive load 47. Winding 39 and a load responsive potentiometer winding 48 are connected in parallel across suitable power supply lines 49. A sliding contact 50 engages winding 48 and is coupled, as shown by phantom mechanical coupling line 51, to the load 47. The position of the contact 50 provides a signal in accordance with the actuated position of the load 47. The potential of the contact 43 establishes a reference determined by the length of a corresponding finger 3 of plate 1 in accordance with the desired actuation of the load 47. The contacts 43 and 50 are connected as a pair of inputs to an amplifier and servo unit 52 and the difference between the two signals provides an error signal from the amplifier and servo unit.

The output of the servo control 52 is connected by an output lead 53 to the load 47 which is adjusted in proportion to the difference of the voltages at contacts 43 and 50. The adjustment of load 47 results in a corresponding repositioning of the contact 50 and reduces the voltage difference between potentiometer contacts 43 and 50. The system continues to actuate the load 47 until the contacts 43 and 50 are at the same voltage level.

The load 47 may be of any character such as a positioning device, a light intensity device, or other means which are to be automatically operated in accordance with a predetermined program.

In summary, plate 1 is pre-formed by proper positioning in cutter 7 and actuation of knife 8 to establish the calibrated operating fingers 3. The plate 1 is positioned in the drawer 19 and the drawer moved into the housing 18. The sliders 31 are thereby positioned from the zero or reference position in accordance with the length of the calibrated fingers 3. Each contact 43 associated with one of the sliders 31 directly provides an electrical signal in accordance with a desired preset program. This signal is compared with a function or load responsive signal at contact 50 and produces an error signal which is fed back to adjust the load 47 until the voltage level of contact 50 corresponds to that of contact 43. Upon establishment of corresponding voltages, the error signal is reduced to zero and the load 47 is at the correct setting.

Referring to FIGS. 9 and 10, a similar control 17 is illustrated having a rotary take-off operated in response to the code card positioning of sliders 31. Elements in FIGS. 9 and 10 corresponding to the previously described elements are correspondingly numbered for purposes of clarity and continuity of explanation.

In FIGS. 9 and 10, each potentiometer winding 39 and contact 43 is eliminated and replaced with a transfer cable 54 which is rotatably looped about a pair of spaced supporting pulleys 55 and 56. The latter are positioned to support the cable in alignment with the movement of slider 31. Cable 54 is completely wound on a rotatable take-off drum or wheel 57 and a tension spring 58 is serially connected in the cable to maintain frictional gripping of the wheel. The slider 31 is provided with depending coupling 59 which is secured to the cable 54 and transmits slider movement to the cable and the take-off wheel 57. A selsyn generator 60 is coupled to wheel 57 and establishes a signal proportional to the positioning of the slider 31. The selsyn generator 60 is connected in a suitable circuit; for example, as shown in FIG. 11.

Referring to FIG. 11, selsyn generator 60 and a receiving selsyn generator 61 are coupled to control the load 47. Each of the selsyn generators 60 and 61 are similarly constructed and includes a primary winding 62 rotatably carried by a rotor, not shown. A delta-connected three-phase secondary winding 63 is supported by a stator, not shown, and magnetically coupled to the primary winding 62.

The primary winding 62 of the receiving selsyn generator 61 is connected to A.C. power supply lines 64. The secondary winding 63 of selsyn generators 60 and 61 have corresponding terminals connected or tied together by suitable jumper leads 65. An amplifier and servo unit 66 is connected across the primary winding 62 of the selsyn generator 60 and includes an output connected to actuate the load 47.

Primary winding 62 of the master selsyn generator 60 is connected to the take-off wheel 57. The primary winding 62 of the receiving selsyn generator 61 is connected to a mechanical output of the load 47, as shown by the coupling line 67.

When primary windings 62 of selsyn generators 60 and 61 are similarly positioned with respect to the secondary windings 63, the secondary voltages are in time phase and no secondary currents flow. However, if either of the primary windings 62 is differently displaced, the secondary voltage of the corresponding three-phase secondary winding 63 moves out of phase with the other secondary winding and a secondary current is established. The secondary current induces a current in primary winding 62 of selsyn generator 60 which energizes the servo unit 66 and actuates the load 47.

The take-off wheel 57 is positively positioned and holds the primary winding 62 of the master selsyn generator 60 in accordance with the movement of the aligned slider 31 and the attached cable 54. The load 47 is energized to vary the output and correspondingly angularly position the primary winding 62 of the receiving selsyn generator 61. When the primary windings 62 of selsyn generators 60 and 61 are similarly positioned, the secondary circulating current drops to zero and the load 47 is de-energized.

The circuit of FIG. 11 therefore basically operates in the manner of FIG. 8 to provide a functional control in response to the calibration of the operating fingers 3 of the code plate 1. The reading of code plate 1 directly establishes the electrical operating signals with a rotary output established by wheel 57 properly actuating the selsyn generators 60 and 61.

In FIGS. 12–14, a construction generally similar to the previous structures is shown incorporating a digital output signal and a visual indication of the position of the sliders 31 independently of the calibration indicia 5 on plate 1. Corresponding elements in the embodiment of FIGS. 12–14 and FIGS. 1–7 are similarly numbered.

In FIG. 12, the potentiometer winding 39 of FIGS. 3–7 has been replaced with a digital signal bar 68 having a plurality of individual signal contacts 69 longitudinally spaced in the path of the associated slider 31. The contacts 69 may be connected in a suitable control circuit by suitable leads. Thus, the potentiometers of FIG. 8 can be replaced by the contacts 69 of bar 68 and a tapped resistor, not shown, to provide a balancing circuit.

The embodiment of FIG. 12 functions in the same manner as the embodiment of FIGS. 3–7 except that a digital output is established in place of the analogue output.

Referring particularly to FIGS. 12–14, a tape 70 is connected at its opposite ends by a cable 71 and spring 72 to form an endless loop carried by a pair of suitable pulleys 73 and 74 journaled in the forward and back walls of the upper portion of housing 18 which is enlarged in FIGS. 12 and 13. Each tape 70 is aligned with the movement of one slider 31. An upstanding connector 75 connects the slider 31 to one end of the tape 70 to position the tape about the forward pulley 73 in accordance with the positioning of the corresponding slider 31.

A series of openings 76 is provided in the front wall of the housing 18 with each of the forward pulleys 73 journaled within the openings to expose and visually present the face of the corresponding tape 70. Scale indicia 77 are provided on the tape 70, as most clearly shown in FIG. 14, and cooperates with a pointer 78 on the adjacent front wall of the housing 18 to provide a visual reading of the positioning of the slider 31 and therefore the actuation of the signal source.

The indicia 77 are properly arranged to provide a zero or off reading with the corresponding slider 31 in the forwardmost position within the housing 18. The inward movement of the slider 31 results in pulling of the tape 70 over the forward pulley 73 and positioning of the scale indicia 77 to directly indicate the movement of the slider 31. The operator can at any time by reading tapes 70 check on the setting of the several load controls.

A knurled hand control disc 79 is secured to a side face of each forward pulley 73 and projects forwardly through the opening 76 to permit manual setting of the tape 70. In the absence of the control plate 1, the operator can manually adjust the several knurled discs 79 to actuate the various loads in accordance with any desired sequence or blend. If a portion of the plate 1 is destroyed or removed, the operator can compensate therefor by manual rotation of the corresponding knurled disc 79 until tape 70 is properly positioned.

The present invention thus provides a code operated control employing a readily filed and formed control storage and actuated element and which is low in initial cost and maintenance and which directly translates the information into operating signals. The code plate may be readily replaced, corrected and read and the control operated thereby in a simple, reliable and facile manner.

The operator can determine at any time whether the correct information is being supplied.

Various modes of carrying out the invention are contemplated as being within the scope of the following claims particularly pointing out and distinctly claiming the subject matter which is regarded as the invention.

I claim:

1. A code storage actuator for actuating a control including a plurality of operating control means each having a positioning element movably mounted for positioning movement in response to a rectilinear force applied thereto, said elements being arranged in laterally spaced relation, an actuating member disposed in the control actuator and having an operating edge extending coextensive of the positioning elements, means for positioning the elements into the location of the actuating member, and said operating edge being off-set to define a plurality of fingers aligned with the control means and said actuating member constituting the prime mover for moving said positioning elements in accordance with the length of the aligned fingers upon proper positioning of the member in the control.

2. In a multiple control including a plurality of side-by-side operating control elements individually movably mounted on a support for movement from an initial position, resilient means urging said elements to said initial position, a plate-like member slidably disposed in the control between an inoperative position and an operative position and having an operating edge extending coextensive of the control elements for movement into engagement of the control elements, means to locate said plate-like member in the operative position overlying said initial position of the control elements, and said operating edge being notched to define a plurality of fingers aligned with the control elements and variously positioning the control elements to selected positions from said initial position dependent upon the length of the aligned fingers upon movement of the plate-like member to the operative position and holding said elements in said selected positions against said resilient means.

3. The structure of claim 2 having visual indicating means connected one to each of said control elements to present the positioning of each control element.

4. The structure of claim 3 having manually operable means connected to said indicating means for manual adjustment of the control elements.

5. In a multiple control including a plurality of side-by-side operating control elements individually movably mounted on a support, resilient means coupled to said control elements and resiliently urging said elements to a standby position, a plate-like member movably disposed in the control and having an operating edge extending coextensive of the control elements for movement into engagement with the control elements for moving the elements from said standby position against the force of said resilient means, said operating edge being notched to define a plurality of fingers aligned with the control elements and variously positioning the control elements to selected positions dependent upon the length of the aligned fingers upon movement of the plate-like member to the actuated position, said fingers being subject to buckling forces as a result of the edge engagement of the member by said elements, and clamping means engaging the top and bottom of each finger for essentially the complete length thereof and thereby prevent shortening or buckling of the fingers and destruction of the operating edge as a result of interengagement with the control elements.

6. In an edge-notched coded control reader for directly establishing a series of outputs in accordance with the configuration of the notched operating edge of a code plate, a housing having a support plate means aligned with a wall opening to receive and slidably accommodate the code plate, a series of laterally-spaced elements aligned with the opening and adapted to be variously positioned from the opening in accordance with the depth of the aligned notches of the operating edge of the code plate, means to position the elements adjacent the opening, means supporting the elements for movement by the code plate as it moves into the housing, and signal establishing means coupled to the elements to provide a direct signal in accordance with the plate input responsive positioning of the corresponding elements.

7. The construction of claim 6 having means to set all of said control elements in a reference position before said code plate is movable into engagement with the control elements.

8. The construction of claim 7 wherein resilient means releasably retain the control elements in the reference position until picked up by the code plate.

9. A coded control for establishing a plurality of selected output signals, a code plate having an operating edge notched to define a plurality of operating fingers of lengths calibrated to the several selected output signals, a series of control elements spaced in accordance with the spacing of the fingers, means movably supporting the elements, guide means associated with said elements for guiding movement of the code plate with the fingers aligned with said elements, said plate having an operating edge extending coextensive of the control elements for movement into engagement of the control elements, said operating edge being notched to define a plurality of fingers aligned with the control elements and variously positioning the control elements to selected positions upon movement of the code plate to the actuated position, and means resiliently holding the control elements in engagement with the operating edge of the card.

10. In a coded control for directly establishing a series of outputs in accordance with the notched operating edge of a code plate defining a plurality of operating fingers, a housing having an opening slidably accommodating the code plate with the operating edge as a leading edge, a series of sliding bars aligned one each with each finger adjacent the opening within the housing, upper and lower guide tracks for each bar slidably supporting the bars for movement normal to the opening, said bars being variously positioned from the opening in accordance with the depth of the aligned operating finger of the code plate, and individual signal establishing means having a movable control element coupled to a bar to provide a direct signal in accordance with the positioning of the corresponding bar.

11. The construction of claim 10 having a spring means secured within the housing and overlying the forwardmost position of the sliding bars to resiliently grasp the bars and hold the bars in the forwardmost position until picked up by operating edge of the code plate.

12. In a code control for directly establishing a series of outputs in accordance with operating fingers defined by a notched operating edge of a code plate, a housing, a sliding code plate drawer in the housing defining a plate chamber substantially complementing a non-notched code plate and extending forwardly of a plate positioned in the chamber, said drawer having a plurality of inner slots aligned with the respective fingers formed by the notched operating edge, bar-like sliders projected one each through the slots and slidably mounted within the housing whereby the back edge of said slots and the operating edge of the code plate determines the positioning of the bar sliders upon complete outward and inward movement of the drawer, and individual signal establishing means one each coupled to the bar sliders and providing a direct signal in accordance with the positioning of the corresponding elements.

13. In a coded control for directly establishing a series of outputs in accordance with operating fingers defined by a notched operating edge of a code plate, a housing, a sliding drawer in the housing defining a chamber complementing a non-notched code plate and being longer than the code plate, locating means for positioning the plate within the drawer, said drawer having a plurality of slots aligned with the respective fingers formed by the notched operating edge and the portions of the drawer defining the slots clamping the side edge of the fingers, control elements projected through the slots and movably mounted within the housing, means to position the control elements in an initial starting position adjacent the forward end of said slots, the operating edge of the code plate positioning the control elements from said initial starting position upon complete inward movement of the drawer, and signal establishing means coupled to the control elements to provide a direct signal in accordance with the positioning of the corresponding elements.

14. In a coded control for directly establishing a series of outputs in accordance with operating fingers defined by a notched operating edge of a code plate, a housing, a sliding drawer in the housing defining a chamber complementing a non-notched code plate and being longer than the code plate, locating means for positioning the plate within the drawer, said drawer having a plurality of slots aligned with the respective fingers formed by the notched operating edge and the portions of the drawer defining the slots engaging and clamping the side edge of the fingers, control elements projected through the slots and movably mounted within the housing with the back edge of said slots and the operating edge of the code plate determining the positioning of the elements upon complete outward and inward movement of the drawer, and signal establishing means coupled to the elements to provide a direct signal in accordance with the positioning of the corresponding elements.

15. In an edge-notched plate reader for directly establishing a series of outputs in accordance with operating fingers defined by a notched operating edge of a code plate, a housing, a sliding drawer in the housing defining a chamber longer than a non-notched code plate and adapted to support the plate, said drawer having a plurality of slots aligned with the respective fingers formed by the notched operating edge, actuating elements projected through the slots and slidably mounted within the housing with the back edge of said slots and the operating edge of the code plate determining the positioning of the elements upon complete outward and inward movement of the drawer, a series of elongated variable impedance devices mounted one each in alignment with a sliding element and including a movable tap, and means physically connected to the tap and to the corresponding actuating element for corresponding positioning thereof.

16. The construction of claim 15 wherein a metallic rod slidably supports the lower end of each actuating element, and a separate contact means is secured to each actuating element and slidably engages the impedance device and the metallic rod whereby the rod constitutes an output connection for said contact means.

17. In an edge-notched plate reader for directly establishing a series of outputs in accordance with the notched operating edge of a code plate, a housing, a sliding drawer in the housing defining a chamber for holding the code plate, said chamber being longer than said plate, said drawer having a plurality of superposed slots in the walls aligned with the respective fingers formed by the notched operating edge, elements projected through the slots and slidably mounted within the housing whereby the back edge of said slots and the operating edge of the code plate determining the positioning of the elements upon complete outward and inward movement of the drawer, a separate signal generator for each of said elements, an endless cable and a pair of spaced pulleys one for each element rotatably mounted within the housing with the endless cable supported in alignment with the movement of a corresponding element, means to connect a point of the cable to the elements, and an output wheel rotatably mounted within the housing and encircled by the endless cable to establish a rotary take-off and coupled to operate the corresponding signal generator.

18. In an edge-notched plate reader for directly establishing a series of outputs in accordance with the notched operating edge of a code plate, a housing, a sliding drawer in the housing defining a chamber complementing a non-notched code plate, said drawer having a plurality of slots aligned with the respective fingers formed by the notched operating edge, elements projected through the slots and slidably mounted within the housing whereby the back edge of said slots and the operating edge of the code plate determining the positioning of the elements upon complete outward and inward movement of the drawer, an endless tape rotatably supported by a pair of spaced pulleys in longitudinal alignment with an element, means connecting the tape to the aligned element for movement therewith, signal generators connected one to each element, an opening in the housing with one of said pulleys mounted within the opening to visually present the face of the tape through the opening and to permit manual positioning of the tape, and indicia on said tape to indicate the position of the connected element and thereby the actuation of the corresponding generator.

19. In an edge-notched plate reader for directly establishing a series of outputs in accordance with the length of operating fingers defined by the notched operating edge of a code plate, a support, control elements slidably mounted on the support, guide means on the support for the code plate to align each operating finger with a control element, means to position the control elements in a reference position, the operating edge of the code plate determining the positioning of the elements from the reference position, a separate looped tape rotatably supported by a pair of spaced pulleys in longitudinal alignment with each element, means connecting each tape to the aligned element for movement therewith, a separate signal generator connected to each element, means to manually turn at least one of said pulleys in each pair of spaced pulleys for manual control of the corresponding element and connected generator, and indicia on said tape to indicate the position of the element and thereby the actuation of the generator.

20. In a coded control for establishing a plurality of selected output signals by a code card element having portions thereof removed to define a plurality of internal operating edges, said edges being laterally spaced and longitudinally offset from a common reference in proportion to said selected output signals, a series of signal control elements laterally spaced in accordance with the lateral spacing of the operating edges, support means for supporting the code card element in alignment with the signal control elements and having means to slidably dispose the card element in an inoperative position and in an operative position, said elements being located in the operative position of the card element and being movable by a force created by the card element moving into the operative position for proportionate positioning by said code card element of the signal control elements from a reference upon longitudinal movement of the code card element relative to said signal control elements, and varying signal generating means coupled to the signal control elements to provide said selected output signals as a result of the corresponding proportionate positioning of the signal control elements.

References Cited by the Examiner
UNITED STATES PATENTS

| | | | |
|---|---|---|---|
| 2,016,681 | 10/35 | Mills | 235—61.12 |
| 2,098,345 | 11/37 | Lentz | 235—61.12 |
| 2,169,213 | 8/39 | Backdahl | 235—61.11 |
| 2,715,703 | 8/55 | Schuck | 318—28 |
| 2,890,432 | 6/59 | Rockafellow | 338—180 X |
| 2,922,976 | 1/60 | Bourns | 338—176 |
| 2,934,734 | 4/60 | Wolfe et al. | 338—176 |
| 3,066,863 | 12/62 | Wilson | 235—61.113 |

ORIS L. RADER, *Primary Examiner.*

MILTON O. HIRSHFIELD, *Examiner.*